US008135262B2

(12) United States Patent
Kusunoki et al.

(10) Patent No.: US 8,135,262 B2
(45) Date of Patent: Mar. 13, 2012

(54) APPARATUS AND METHOD FOR PROGRAMMING THE RECORDING OF BROADCAST PROGRAMS AND DELAYING THE RECORDING END TIMES WHEN EXTENSION KEY WORDS ARE DETECTED

(75) Inventors: Yoshiaki Kusunoki, Tokyo (JP); Keiji Hatanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1423 days.

(21) Appl. No.: 10/590,198

(22) PCT Filed: Feb. 10, 2005

(86) PCT No.: PCT/JP2005/002024
§ 371 (c)(1),
(2), (4) Date: Jan. 24, 2007

(87) PCT Pub. No.: WO2005/086475
PCT Pub. Date: Sep. 15, 2005

(65) Prior Publication Data
US 2007/0172196 A1 Jul. 26, 2007

(30) Foreign Application Priority Data

Mar. 9, 2004 (JP) ................................. 2004-065228

(51) Int. Cl.
*H04N 5/76* (2006.01)
(52) U.S. Cl. ..................................................... 386/291
(58) Field of Classification Search .................... 386/83, 386/124–126, 291, 296, 297, 298; 725/50, 725/53, 39
See application file for complete search history.

(56) References Cited

U.S. PATENT DOCUMENTS

| 5,963,264 | A | * | 10/1999 | Jackson ......................... 348/460 |
| 6,252,629 | B1 | * | 6/2001 | Takatori ........................ 348/460 |
| 7,080,396 | B2 | * | 7/2006 | Gong .............................. 725/50 |
| 2002/0054068 | A1 | * | 5/2002 | Ellis et al. ...................... 345/716 |
| 2003/0185544 | A1 | | 10/2003 | Azuma |
| 2004/0010807 | A1 | * | 1/2004 | Urdang et al. ................ 725/136 |
| 2005/0055715 | A1 | * | 3/2005 | Minnick et al. ................. 725/58 |
| 2005/0286867 | A1 | | 12/2005 | Kita et al. |

FOREIGN PATENT DOCUMENTS

CN    1698361 A    11/2005
(Continued)

OTHER PUBLICATIONS

Machine generated translation of JP 2003-134431 to Kato, May 2003.*

(Continued)

*Primary Examiner* — David Harvey
(74) *Attorney, Agent, or Firm* — Birch, Stewart, Kolasch & Birch, LLP

(57) ABSTRACT

An apparatus and method for programming the recording of broadcast programs, for programming recording by setting the recording start time and the recording end time of a given program in the broadcast program information is provided, wherein the apparatus and method for programming the recording of broadcast programs, delays the recording end time of programmed broadcast program, when a broadcast program is present in which an extension keyword is detected by searching electronic program guide information acquired regarding broadcast programs to be programmed, and electronic program guide information acquired regarding programs scheduled to be broadcast on the same channel and the same date as and prior to the programmed broadcast program, for predetermined extension keywords indicating program extension or delay.

12 Claims, 8 Drawing Sheets

FOREIGN PATENT DOCUMENTS

| | | | |
|---|---|---|---|
| JP | 10-21601 A | 1/1998 | |
| JP | 10-112087 A | 4/1998 | |
| JP | 10-269233 A | 10/1998 | |
| JP | 11-243521 A | 9/1999 | |
| JP | 2003-134431 | * | 5/2003 |
| JP | 2003-134431 A | 5/2003 | |
| JP | 2003-199050 A | 7/2003 | |
| JP | 2004-32485 A | 1/2004 | |
| JP | 2004289565 | * | 10/2004 |
| WO | WO 2004/100538 | * | 11/2004 |

OTHER PUBLICATIONS

Leaflet for HDD&DVD Video Recorder Manual for RD-XS32 and RD-XS35 by Toshiba, p. 45, Jan. 22, 2004.

* cited by examiner

Fig.3

| February 1(Sunday) | Channel 8 | Channel 10 | channel 12 |
|---|---|---|---|
| | electronic program guide listing — current time: 2004 February 1(Sunday) 16:04 | | |
| 19 | 00 news | 00 Professional baseball game XXX vs. YYY, ZZZ ballpark, Color commentator: XXXX, Play-by-play announcer: YYYYY (to be broad cast until the end of the game) | 00 animation |
| 20 | 00 documentary | | 00 quiz |
| 21 | 00 news coverage special program | 00 talk show | 00 variety |

Fig.4

| programming broadcast programs table | | | | current time: 2004 February 1(Sunday) 16:04 | | |
|---|---|---|---|---|---|---|
| execution | channel | date of recording | start time | end time | mode | extension |
|  | Channel 10 | February 1 (Sunday) | 21:00 | 22:00 | 22:00 |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |

Fig.7

| electronic program guide listing | the current time: 2004 April 2 (Friday) 18:10 | | |
|---|---|---|---|
| April 2 (Friday) | Channel 8 | Channel 10 | channel 12 |
| 19 | 00 news | 00 Professional baseball game ZZZ vs. XXX, YYY ballpark, Color commentator: XXZXX, Play-by-play announcer: YYZYY (extension may be occured) | 00 animation |
| 20 | 00 documentary | | 00 variety |
| 21 | 00 business | 00 Friday drama | 00 music |

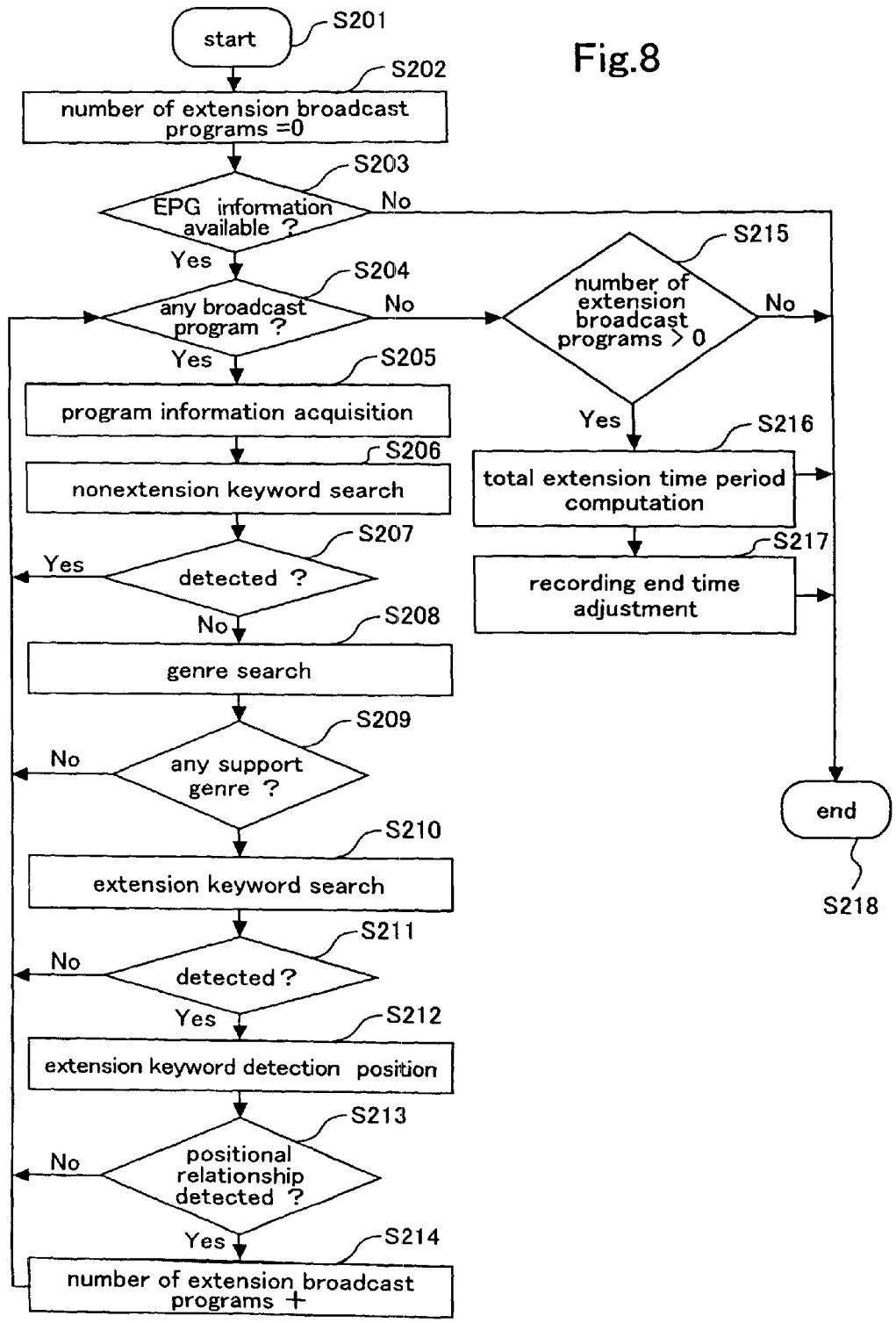

APPARATUS AND METHOD FOR PROGRAMMING THE RECORDING OF BROADCAST PROGRAMS AND DELAYING THE RECORDING END TIMES WHEN EXTENSION KEY WORDS ARE DETECTED

TECHNICAL FIELD

This invention relates to apparatus and methods for programming the recording of broadcast programs, for programming and recording programs that are to be broadcast.

BACKGROUND ART

Conventionally, when broadcast programs scheduled to be broadcast are programmed, a user set up the channel, the start time, and the end time, of a program for apparatus programming the recording of broadcast programs and the apparatus for programming the recording of broadcast programs has recorded the programs in line with the contents of the setting. In the meantime, in real broadcasting (e.g., a sports program such as a professional baseball game), it has occurred that the broadcast time is often extended due to the game situation. As a result, a situation has occurred in which when a program scheduled to be broadcast subsequent to an extended program remains as registered by maintaining the originally scheduled start time and end time thereof on an apparatus for programming the recording of broadcast programs, part or the whole of the programmed broadcast program fails to be recorded due to the extension of the program. Therefore, it has been proposed (e.g., refer to Patent Document 1) that by searching electronic program guide information of a programming broadcast program or a program scheduled to be broadcast prior to the programming broadcast program, for a maximum extension time, the end time of the programming broadcast program recording is extended in accordance with, when detected, the maximum extension time.

Patent Document 1

Japanese Patent Publication 2003-134431 (page 10, lines 34 through 43, FIGS. 1 and 2)

DISCLOSURE OF INVENTION

[Problem that the Invention is to Solve]

However, information being represented by character codes of the current electronic program guide information has rarely described maximum extension times, thus causing failures of extending the recording end time with respect to most programs that are likely to be extended. As a result, part or the whole of a program has been incapable of being recorded.

This invention has been made to solve the above described problems with conventional art. An object is to provide an apparatus and method for programming the recording of broadcast programs, that prevents an occurrence of failures of part or the whole of programming broadcast programs by detecting a possible extension of a programming broadcast program and broadcast programs scheduled to be broadcast prior to the programming broadcast program, and by then delaying, when the program is judged to be extended, the recording end time of the programming broadcast program.

[Means for Solving the Problem]

An apparatus for programming the recording of broadcast programs related to the present invention comprises: a receiving means for receiving broadcast programs; a recording means for recording broadcast programs received by the receiving means; a recording programming means for setting the recording start time and the recording end time of a given program in the broadcasting programs, to program a recording; a broadcast program information acquisition means for acquiring electronic program-guide information; an extension keyword search means for searching the electronic program-guide information acquired about broadcast programs to be broadcast on the same channel and the same date as and prior to the programmed broadcast program, for predetermined extension keywords indicating a broadcast program extension or delay; and, if as a result of search by the extension keyword search means, broadcast programs in which the extension keyword is detected are present, a delay means for delaying the recording end time of the programmed broadcast program.

Moreover, a recording programming method related to the present invention, being a recording programming method of setting in order to receive and record broadcast programs, the recording start time and the recording end time of a given program in the broadcast programs, to program a recording, includes the steps of: acquiring electronic program guide information; searching the electronic program guide information acquired regarding broadcast programs to be broadcast on the same channel and the same date as and prior to the programmed broadcast program, for predetermined extension keywords indicating a broadcast program extension or delay; and delaying the recording end time of the broadcast program to be programmed, if as a result of search in the extension keyword search step, the extension keyword is found.

[Effects of the Invention]

According to an apparatus or method of programming the recording of broadcast programs of this invention, electronic program guide information acquired about programming broadcast programs, and electronic program guide information acquired about broadcast programs scheduled to be broadcast on the same channel and the same date as and prior to the programmed broadcast program, are searched for a predetermined extension keyword indicating program extension or delay, since, when a broadcast program is present in which an extension keyword is detected, the recording end time of a programmed broadcast program is delayed, even though a programmed broadcast program, and a broadcast program scheduled to be broadcast prior to the programmed broadcast program, each on the same channel, are extended on their real broadcasting, there are effects that a situation in which part or the whole of the programmed broadcast program fails to be recorded can be avoided.

BRIEF DESCRIPTION OF DRAWINGS

FIG. 3 is a diagram illustrating an electronic program guide listing screen in Embodiment 1;

FIG. 4 is a diagram illustrating a programming broadcast program table screen in Embodiment 1;

FIG. 7 is a diagram illustrating an electronic program guide listing screen in Embodiment 1; and FIG. 8 is a flowchart illustrating a method of programming the recording of broadcast programs in Embodiment 2.

[References of Numerals and Symbols]

"1" is recording programming apparatus; "2" antenna; "3" remote control; "4" monitoring display; "5" TV tuner; "6" A/D converter; "7" MPEG encoder; "8" recording buffer; "9" slicer; "10" CPU; "11" HDD controller; "12" HDD; "13" volatile memory; "14," MPEG decoder; "15" readout buffer; "16" remote control interface; "17" D/A converter; "18" OSD; "19" nonvolatile memory; "20" EPG unit; "21" encoder/decoder control unit; "22" system control unit; "23" display control unit; "24" EPG control unit; "25" EPG data analysis unit; "26" EPG data backup unit; "27" EPG database; and "28" recording programming unit.

BEST MODE FOR CARRYING OUT OF INVENTION

Embodiment 1

Figure 1:
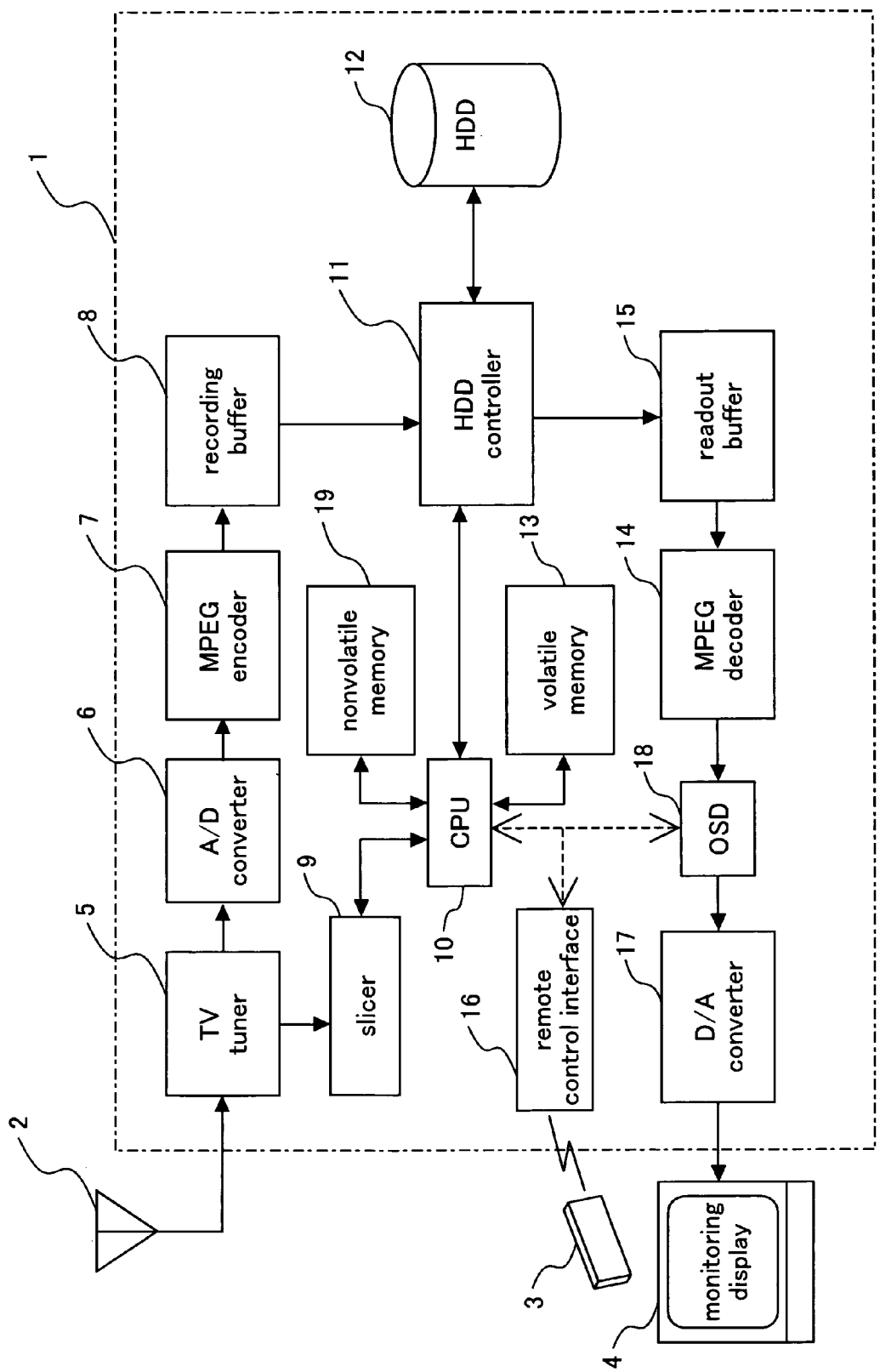
FIG. 1 is a block diagram outlining a configuration of an apparatus for programming the recording of broadcast programs according to Embodiment 1 of the present invention.

FIG. 1 is a block diagram outlining a configuration of an apparatus for programming the recording of broadcast programs according to Embodiment 1 of the present invention. As shown in FIG. 1, a recording programming apparatus 1 includes a TV tuner connected to an exterior antenna 2, an A/D (analog/digital) converter 6, an MPEG (motion picture expocoding group) encoder 7, a recording buffer 8, a slicer 9 for extracting an EPG (electronic program guide) information, a CPU 10, an HDD (hard disk drive) controller 11, an HDD 12, a remote control interface 16 for receiving signals from the remote control 3, and a nonvolatile memory 19. The apparatus 1 for programming the recording of broadcast programs also includes a readout buffer 15, an MPEG decoder 14, an OSD (on-screen display) 18, a D/A (digital/analog) converter 17 for outputting into a display monitor 4 analog video signals, and a volatile memory 13.

In FIG. 1, the TV tuner 5 receives broadcast programs via the antenna 2. The TV tuner 5, having a function of tuning in to a designated channel, outputs tuned channel's video and audio signals to the A/D converter. The A/D converter 6 converts into digital signals, analog video signals and audio signals from the TV tuner 5. The MPEG encoder 7 compresses in an MPEG format digitized video signals, outputting bitstreams that are the compressed data. The HDD 12 stores bitstreams outputted from the MPEG encoder. The HDD controller 11, being a controller for controlling the HDD 12, controls writing and reading operations of the bitstreams. The recording buffer 8 is provided so that while writing bitstreams into the HDD 12, the bitstreams outputted from the MPEG-encoder 7 are capable of being recorded without a lack of bitstreams.

The MPEG decoder 14 decodes the bitstreams compressed in the MPEG format to convert into non-compressed digital video signals. The readout buffer 15 avoids occurrence of buffer underflow in decoding by reading and storing in advance bitstreams that the MPEG decoder 14 requires. The OSD 18 is a drawing device for superimposing text and image data onto MPEG-decoded digital image signals. The D/A converter 17 converts digital video signals into analog video signals that the monitoring display 4 can display.

The slicer 9 extracts an EPG superimposed into VBIs (vertical blanking intervals) of broadcast wave. The remote control interface 16 receives control signals from the remote control 3, and transmits them to the CPU 10. The CPU 10 controls of the recording programming apparatus in Embodiment 1 and also performs various data conversions. Moreover, the CPU 10 is connected with the volatile memory 13 that allows data to be stored while power is supplied, and the nonvolatile memory 19 that allows data to be stored even while power is interrupted and reads out stored data at the next start-up of the apparatus.

Figure 2:
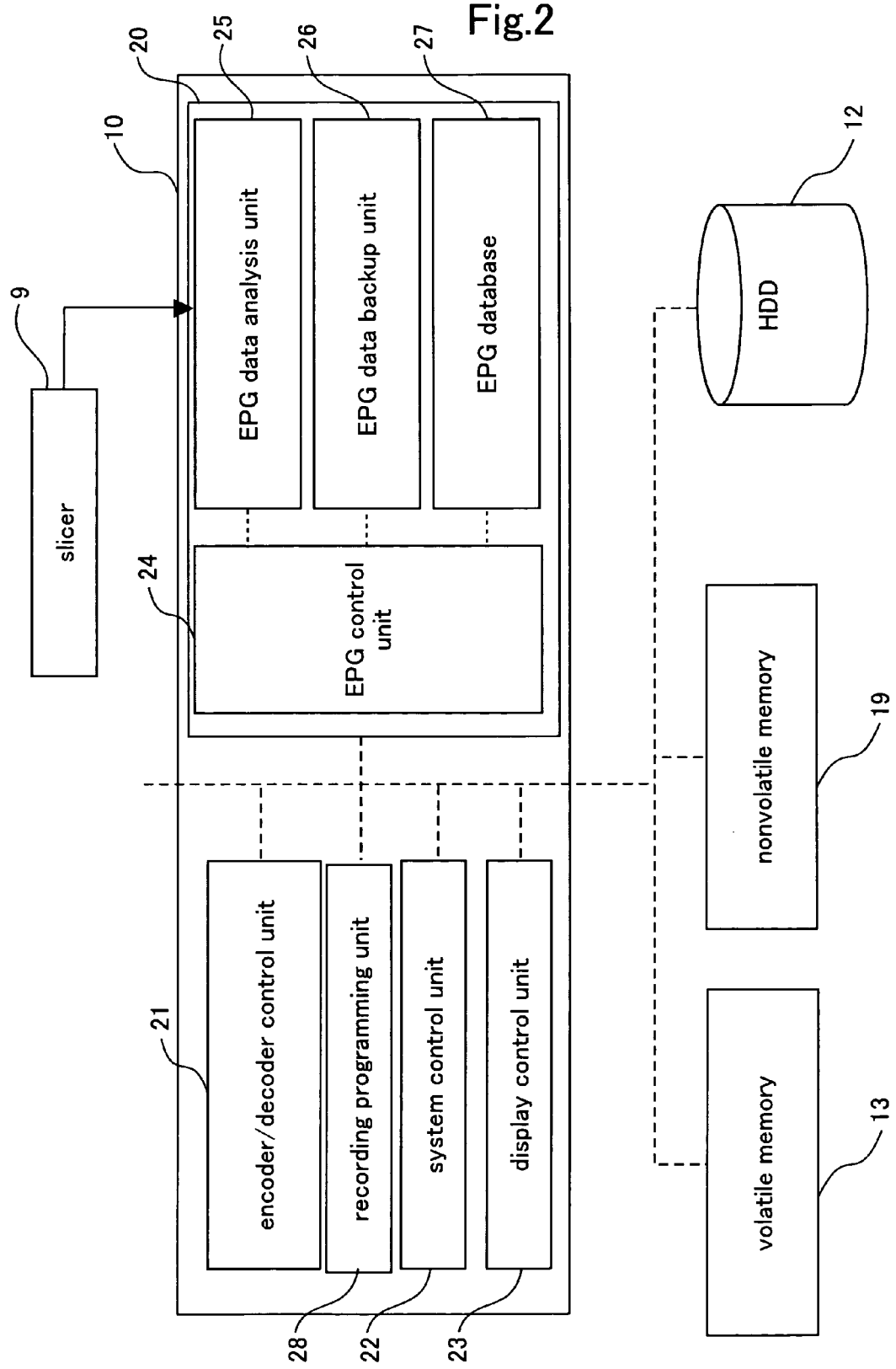
FIG. 2 is a block diagram illustrating a software configuration in Embodiment 1.

FIG. 2 is a block diagram illustrating a software configuration running on the CPU 10 in Embodiment 1. As shown in FIG. 2, a CPU-10-executing software configuration includes an EPG unit 20, an encoder/decoder control unit 21, a system control unit 22, and a recording programming unit 28. The EPG unit 20 comprises an EPG control 24, an EPG data analysis unit 25, an EPG data backup unit 26, and an EPG database 27.

The encoder/decoder control unit 21 controls the MPEG encoder 7 and the MPEG decoder 14. The system control unit 22 performs the status control of the apparatus for programming the recording of the broadcast programs based on input operations from control buttons (not shown) provided on the apparatus main unit, input operation from the remote control interface 16, and on a status of the apparatus for programming the recording of the broadcast programs. The display system control unit 23 displays status, etc. on a display unit (not shown) provided on the apparatus main unit and on an exterior monitor via the OSD 18, in response to the status of the apparatus for programming the recording of the broadcast programs. The recording programming unit 28 first performs processing of video-programming that a user has set, next checks whether there has occurred duplication between information that has already programmed when new programming is made and information that is newly programmed, and then stores the programming contents into the nonvolatile memory 19. In the EPG unit 20, the EPG control unit 24 takes control of the EPG data analysis 25, the EPG data backup unit 26, and the EPG database 27, in response to EPG status such as EPG acquisition and EPG data display. The EPG data analysis unit 25 analyzes the EPG data extracted by the slicer 9.

Specifically, since the EPG data is transmitted, as packetized, into the VBI, the analysis unit performs packet-analysis for dividing the EPG data into units of packets and categorizing on a kinds of packets basis, decryption for decrypting the EPG data that is conveyed as encrypted, and decompression for decompressing the EPG data that has been compressed so as to reduce the volume of transmission data. The EPG data backup unit 26 performs backup processing for saving the EPG data onto the HDD 12 so as to display a broadcast program guide listing without reacquisition of the EPG data when the recording programming apparatus is powered off and then powered on again, as well as writing onto the volatile memory 13 data analyzed by the EPG data analysis unit. The EPG database 27 provides the recording programming unit 28 as being a superordinate module utilizing the EPG, the system control unit 22, and the display system control unit 23 with various APIs (application programming interfaces) for referring to and utilizing the EPG data, as well as organizes a variety of information items (for example, start time, end time, broadcast time period, channel, title, detailed information, program genre) being included in the EPG data after having been analyzed by the EPG data analysis unit 25.

Next, the operation of the apparatus for programming the recording of broadcast programs 1 will be described. First, a case in which an apparatus for programming the recording of broadcast programs 1 performs recording of a broadcast program will be explained. It is assumed that programming data relating to a broadcast program planned to be recorded has already been set, and stored into the nonvolatile memory 19. While an apparatus 1 for programming the recording of broadcast programs being in standby, typically, when the recording start time (e.g., three minutes prior to the recording start time) of a programmed broadcast program approaches, the system control unit 22 starts, which is set as timer-start-up in advance. Then the system control unit 22 provides a start-up instruction to each of modules (all of the modules include the encoder/decoder control unit 21, the recording programming unit 28, and the display system control unit 23 etc), and each of constituent elements (all of the element inside the apparatus 1 for programming the recording of broadcast programs, including the MPEG encoder 7, the MPEG decoder 14, and the HDD 12 etc), and moreover to provide an instruction to the encoder/decoder control unit 21 so as to put the MPEG encoder 7 into standby mode to wait for recording. When the recording start time arrives, the broadcast waves received by the antenna 2 are turned to the channel corresponding to the programmed broadcast program by the TV tuner 5 tunes, and its video and audio information will be captured. Furthermore, the A/D converter 6 converts analog video signals into, e.g., digital signals conforming to Code Rec656, etc. The MPEG encoder 7 compresses in the MPEG format the digital video signals. Bitstreams outputted from the MPEG encoder 7 are temporarily stored into the recording buffer 8, and written in the order of being stored, onto the HDD 12 controlled by a HDD controller 11.

Next, the playback operation of the recording programming apparatus 1 will be described. A user manipulates the remote control 3 (or a control panel, not shown, on the apparatus main unit) to display on, e.g., the monitor unit 4, a broadcast program table recorded in the HDD 12. The user selects by manipulating the remote control a reproduction-desired program from the broadcast program table displayed on the display monitor 4, and gives instructions to reproduce the program. These processings are executed by receiving radio or infrared signals transmitted from the remote control 3 at the remote control interface 16 and then sending the instructions to the CPU 10. The CPU 10 reads out the playback-requested program via the HDD controller 11, storing the bitstreams into the readout buffer memory 15. The MPEG decoder 14 reads out the bitstreams having been stored into the readout buffer 15, and then performs MPEG-decoding. Decoded digital video signals are combined with other text display data signals, etc., and further, the combined digital video signals are converted by the D/A converter 17 into analog signals, which are outputted onto the exterior display monitor 4, presenting the user with video images.

Next, a method of acquiring EPG information by using the apparatus 1 for programming the recording of broadcast programs will be described. Here, a case will be explained in which the EPG data is sent as superimposed onto the VBIs of broadcast waves in a particular channel. The apparatus 1 for programming the recording of broadcast programs equipped with only one TV tuner may, in some cases, be incapable of receiving EPG-superimposed channels because the TV tuner is in use while broadcast programs are being recorded or viewed. Consequently, the EPG information is assumed to be received only when the recording programming apparatus is apparently powered off, e.g., when in the standby mode. Note that when an extra TV tuner is provided for exclusively receiving the EPG information, or a method is adopted such that a plurality of TV tuners is switched over from one tuner to another on a timely basis, the EPG data can be received even in a state in which the recording programming apparatus is powered on or in operation.

Since, in Embodiment 1, only one tuner as the TV tuner 5 is mounted, the apparatus is assumed to receive, being in standby, signals. It is assumed that the apparatus for programming the receiving of broadcast programs has been in the standby mode and now the time when the EPG information is broadcast arrives. EPG-superimposed waves are received by the antenna 2 and tuned in to EPG-superimposed channels by the TV tuner 5, and the slicer 9 extracts EPG data superimposed onto VBIs of video signals. The EPG data in Embodiment 1 is supposed to be that the data is transmitted being divided into minute packets, and also each packet is attached with a packet ID for identifying what data the packet contains. In addition, information contained in the packets can be encrypted as required, so as to be incapable of being browsed or falsified easily. Moreover, each packet is compressed to reduce the data volume thereof. With respect to the EPG data that has been processed as described above, the EPG data analysis unit 20 performs on a timely basis a packet-analysis for classifying packet data on a kind of packets basis, decryption for decrypting the encrypted EPG data, and decompression for decompressing the EPG data that has been compressed, and returning to the original EPG data before compression. The processing of the EPG data as described above is performed by the EPG data analysis unit 20, being stored into the volatile memory 13.

The EPG data stored in the volatile memory 13 is wiped out when the apparatus 1 for programming the receiving of broadcast programs is powered off, resulting in the volatile-memory-13-stored EPG data being unavailable at the time of next start-up. Therefore, the same EPG data stored in the volatile memory 13 is stored as a backup into the HDD 12 or the nonvolatile memory 19. The data backup is performed after the EPG data acquisition, and the data analysis have been completed. In the meantime, restoration is performed in which the backed-up EPG data is written into the volatile memory 13 at the next power-on. It is the EPG data backup unit 26 that backs up and restores the EPG data. When backing up the EPG data in the HDD 12 or the nonvolatile memory 19, the EPG data backup unit 26 compresses and encrypts the data so as to reduce the EPG data volume, and increase confidentiality protection for the data. Furthermore, as processing in which the EPG data is returned from the HDD 12 and the nonvolatile memory 19, to the volatile memory 13, the EPG data backup unit 26 performs decompression of the compressed EPG data, and decryption of the encrypted EPG data. The EPG data stored in the volatile memory 13 is converted by the EPG database 27, into a data format that is easier to use. In addition, the EPG database 27 provides by means of the API the contents of the converted EPG data, to the recording programming unit 28, the system control unit 22, and the display system control 23, being superordinate modules. This API includes a database construction API. And by called this construction API the EPG database 27 loads the EPG data into the volatile memory 13.

Next, displaying onto the screen the EPG data will be described. When a user desires to display a program guide listing utilizing EPG-data, the user presses EPG display buttons provided on the remote control 3. Then, the remote control 3 sends to the remote control interface 16 signals for displaying the program guide listing, and further, the interface 16 sends to the CPU 10 a command for EPG displaying. In the CPU 10, the system control unit 22 interprets the command from the remote control 3 and the remote control interface 16, calls a database construction API prepared by the EPG database 27, and builds the EPG database. As a matter of course, when the EPG database has already been created, the construction API need not be called. By making use of the EPG database 27 created in this way, the display system control unit 23 collects the program information corresponding to designated dates, times and channels, creates a screen image on the OSD 18, and displays it on the display monitor 4. A display screen example of the electronic program guide table utilized EPG information is shown in FIG. 3. In this display example, broadcast times are indicated vertically in the electronic program guide listing, and program channels laterally. Each program is disposed so as to occupy an area corresponding to channel and time zone to be broadcast. Programs outside the display area can be displayed inside the display area by manipulating the up/down/right/left key on the remote control.

Next, a method of reserving a desired program from an electronic program guide listing displayed on the screen will be described. In FIG. 3, a user can select a desired recoding programming broadcast program by manipulating the remote control up/down/right/left key. When a desired program has been selected by the remote control 3, pressing the decision key makes the screen jump to a programming broadcast program listing screen (refer to FIG. 4), and then the selected program be additionally displayed in an empty space of the programming broadcast program listing screen. The programming broadcast program listing screen displays in a tabular form, programming recording programs; programmed broadcast programs are indicated as a table, thereby giving an advantage of being easy to check. Moreover, setting information on a programming broadcast program, e.g., the recording start time, and the end time thereof can be changed on the programming broadcast program listing screen. That is, by selecting the programming broadcast program by the remote control 3, and pressing the decision key, the screen can enter a mode enabling modification of setting values relevant to the programming broadcast program. Along with the fact that the programming broadcast program information having been added onto the programming broadcast program listing screen is stored into the nonvolatile memory 19, the start timer of the system control unit 22 is set to the start time so that the recording programming apparatus starts up a few minutes, e.g., three minutes before the recording start time of a program having the earliest recording start time among the programmed broadcast programs. This allows the apparatus to be automatically powered on to start recording, even though it has been turned off. The operation of the recording is as has been described previously.

Figure 5:
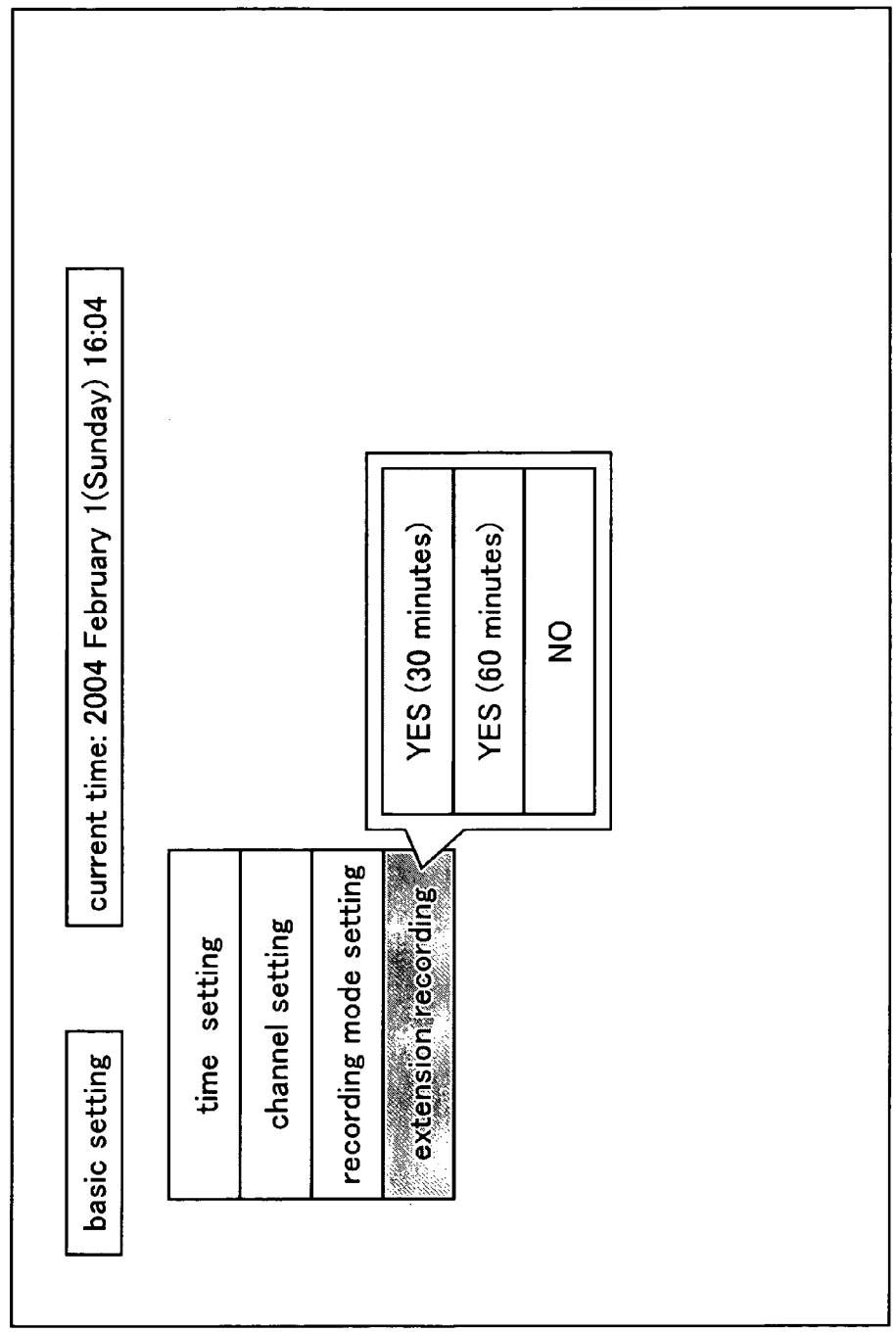
FIG. 5 is a diagram illustrating a setting screen in Embodiment 1.

Next, before describing a method of recording a broadcast program to be extended, a setting method of extending a broadcast program recording will be explained. As one of the setting items on the basic setting screen (refer to FIG. 5) of the programming apparatus 1, a setting item about the extension recording function that is a function to change, by detecting programs to be extended or delayed, the recording end time, i.e., in FIG. 5, an item of "extension recording" is provided. From this item, whether or not the extension recording is performed, as well as how long the recording needs to be extended when the extension recording is performed (i.e., the extension time period per extension-keyword-detected program), can be set. When "No" is selected in the extension recording items, the extension recording will not be performed. In the extension recording items, when broadcast programs are detected in which their broadcasting is likely to be extended or delayed while "Yes (30 minutes)" is selected, the video-recoding is performed with the recording end time delayed by 30 minutes every detected program. When programs are detected in which the broadcasting is likely to be extended or delayed while "with (60 minutes)" is selected, the video-recoding is performed with the recording end time delayed by 60 minutes every detected program. In Embodiment 1, although time period to be extended is made selectable among the preset times, the time period may be made selectable as a time to be extended. In this way, when extension time period is made selectable, the extension time period can be selected in response to user's preference (when a user desires to avoid needless recording, a shorter time period is selected, and when the user desires to avoid failure of recording, a longer time period is selected).

Next, a recording method of recognizing that the broadcast time of a programmed broadcast program is extended or delayed, so that the recording end time is changed, will be described. The method of programming the broadcast programs is the same as that of programming a desired program from an electronic program guide listing (refer to FIG. 3) as has been described previously. The difference respect in that the likelihood of broadcasting extension is judged during a period after a broadcast program to be programmed has been selected until the programming broadcast program table is displayed, and the recording end time of the programmed broadcast program is changed accordingly when broadcasting the program is extended or delayed. The method of recording by changing its end time will be described by using the flowchart shown in FIG. 6. When the programming of program is executed (Step S101), the recording programming unit 28 having a function of reserving programs sets to zero (Step S102) which is the number of the extension programs, and checks (Step S103) whether or not EPG information having program guide information is present. When there is no EPG data available, the processing is completed (Step S112). In the case where the EPG data is available, the programming unit 28 searches for programs that are scheduled to be broadcast on the same channel and the same date as and prior to the programmed broadcast program(Step S104), and, when a target program is found, acquires the program-related broadcast information(Step S105). With respect to character information in the acquired information, EPG programs' detailed information such as program titles, program contents, and performers, the programming unit 28 searches for extension keywords indicating that one or a plurality of preset programs be extended or delayed(Step 106). As a result of the extension keyword search, if predetermined extension keywords are found (i.e., if a consecutive predetermined extension phrase, or a combination of non-consecutive two-or-more predetermined phrases, is detected), the program is regarded as a program likely to be extended (Step 107), thus resulting in the number of extension programs likely to be extended (the number of the extension programs) being increased by one (Step S108). As stated above, when finishing the extension keyword search of one program, the presence/absence of the next program is searched for (Step 104), and subsequently the aforementioned extension keywords are searched for. The keyword search from Step S104 through Step S108 is executed repeatedly until the search of all the corresponding programs is completed. Upon completion of searching all of the corresponding programs, the processing exits from the loop. If the number of extension programs is found (Step S109), the programming unit 28 computes the total extension time period obtained by multiplying the preset extension time period by the number of extension programs (Step 110), delays the recording end time by only the total extension time period computed, and writes into the nonvolatile memory 19 the modified recording end time (Step 111). The subsequent operation is the same as that described in the method of reserving a desired program by means of the aforementioned electronic program guide information.

Next, a method of detecting a program extension will be demonstrated by giving an example of a specific detection extension keyword. The assumption is made that a talk show scheduled to be broadcast at 21:00, February 1(Sunday) as shown in FIG. 3 is recorded. This talk show broadcasting is assumed to start at 21:00 and end at 22:00. In the case of recording this program as usual, a recording start time is set to 21:00, and an end time thereof to 22:00. Here, the extension recording function is assumed to be effectively set up, and the extension time period to be set to 30 minutes. In addition, as extension keywords for searching for program extension search, e.g., "Extension" and "Until the end of the game" are assumed to be set. In the meantime, the assumption is made that search targets are detailed information including description of program titles, program contents, performers, etc., as EPG text data.

Figure 6:
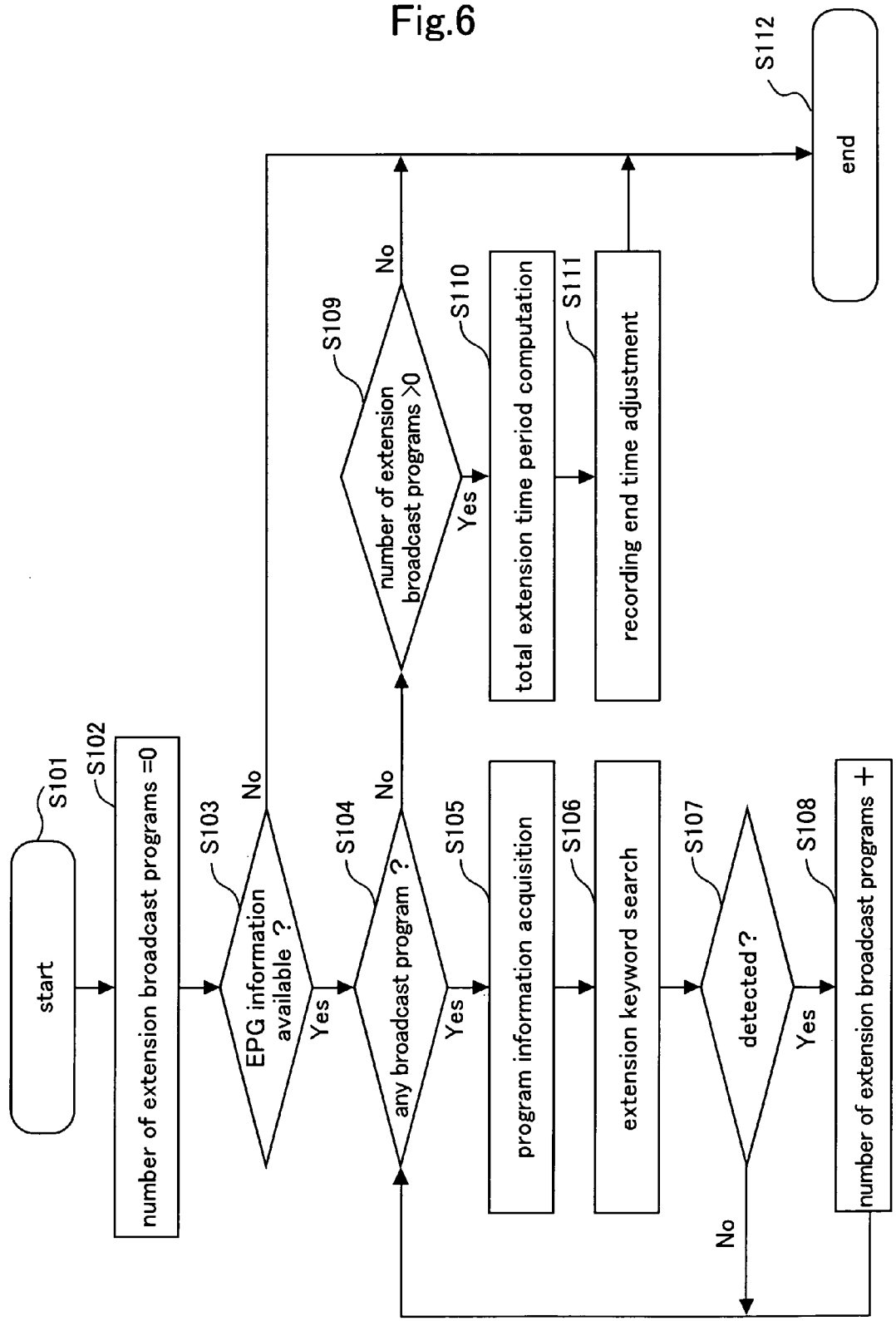
FIG. 6 is a flowchart illustrating a method of programming the recording of broadcast programs in Embodiment 1.

Here, when a talk show is selected by a user on the remote control 3, an algorithm as shown in FIG. 6 described above operates, selects programs to be broadcast prior to the talk show, and executes search for extension keywords of the program information. During this processing, a search of a professional baseball game to be broadcast at 19:00 is executed as well for the above-discussed extension keyword. According to program information obtained from the EPG, this professional baseball game scheduled to be broadcast at 19 o'clock is entitled "Professional Baseball Game XXX vs. YYY", and provided with detailed program information of "Ballpark: ABCXYZ, Color commentator: XXXXX, Play-by-play announcer: YYYZZZ (to be broadcast until the end of the game)." When this title and its detailed information are searched for the aforementioned extension keywords "Extension" or "Until the end of the game", judgment is made that the keywords meet "To be broadcast until the end of the game," so that there is a program whose broadcasting is extended or delayed. Accordingly, the recording end time of 22:00 will be reset to 22:30, delayed by 30 minutes corresponding to this program extension.

Furthermore, in the case of recording "Friday-drama", as shown in FIG. 7, as well, detailed information about previously broadcasting "professional baseball game ZZZ vs. XXX", including "YYY Ballpark, Color commentator: XXZZXX, Play-by-play announcer: YYZYY (Extension may be occurred.), can be detected in a similar way, allowing the recording end time to be modified from 22:00 to 22:30.

As discussed above, in the apparatus 1 for programming the recording of broadcast programs, configured as in Embodiment 1, the recording end time of a programmed broadcast program can be changed by detecting an extension keyword indicating a program whose broadcasting is to be extended or delayed; in the result, an occurrence in which part or the whole of the programmed broadcast program fails to be recorded can be avoided.

Additionally, since a means for detecting a program whose broadcasting is extended or delayed, detects those from character strings of the program information, particular formats and transmission means are unnecessary in order to detect that broadcasting a program is extended or delayed.

With reference to a time period to be extended from the program recording end time, since the extension time period is preset, it is unnecessary to detect any time period to be extended, or recording end time to be modified. That is, because it is unnecessary to detect the extension time period, and the recording end time to be modified, but it is only necessary to detect the probability of the program extension or delay, accuracy of detecting a broadcast program being extended or a program being delayed is enhanced.

Still furthermore, by detecting broadcast programs that are extended or delayed, and the number of the programs, so as to compute a total extension time period by multiplying the number of the programs by the preset extension time period, the recording end time can be delayed by only this computed total extension time period, so that this can cope with cases as well in which broadcasting a plurality of programs are extended or delayed.

It should be noted that in Embodiment 1, an EPG-information-acquiring means indicates a case in which the EPG data is superimposed onto a broadcasting wave, however, the means is not limited to that superimposed onto the broadcasting carrier, but may be acquired by means of communication lines, storage media, etc.

Note that, in Embodiment 1, a broadcast program detection method has utilized detailed information of the broadcast program described as character strings, however, the detection method is not limited to target character strings, but may target significant information that is similar to the character strings.

Note further that although in Embodiment 1, a range where broadcast programs likely to be extended or delayed are detected is limited to "the same day as that of a programming broadcast program", "the same day" as referred herein not only means calendar dates, but may, in some cases, means a day defined in the EPG (e.g., one day from 5:00 a.m. on one day to 5:00 a.m. on the following day) or a day defined by broadcasters.

Embodiment 2

FIG. 8 shows a flowchart for detecting a broadcast program extension or delay so as to modify the recording end time of a programming broadcast program, according to Embodiment 2 in order to implement the present invention. The configuration of a recording programming apparatus in Embodiment 2 is the same as that in Embodiment 1. In Embodiment 2, regarding a method of detecting possibilities of extension or delay of a programming broadcast program scheduled to be broadcast prior to the programming broadcast program, by further adding, in addition to the extension keyword search in Embodiment 1, positional relationships of a plurality of detected extension keywords, and non-extension keyword detection as well as a genre search of search-targeted programs, accuracy of detecting a program that is probably extended or delayed is enhanced.

Referring to FIG. 8, a method will be described in which a broadcasting time of a programmed broadcast program is recognized to be extended or delayed, thereby the recording end time is changed, and then recording is performed. The method of programming a broadcast program is the same as that of programming a desired program from an electronic program guide listing as described in Embodiment 1, and also that of Embodiment 1 in which whether the program is likely to be extended is judged during a period until a programming broadcast program table is displayed, and a recording end time is changed when the program is judged to be extended. In Embodiment 2, however, in addition to program titles and the program detailed information of the EPG, the possible extension of the program is searched by using the genre to which the program belongs to as well.

In the recording programming unit 28 having a programming function of broadcast programs, when programming a broadcast program is executed (Step S201), the number of extension programs is reset to initial value "0" at first (Step S202). Furthermore, checking-out is made whether or not EPG information having program information is present (Step S203). In cases where there is no EPG data available, the process ends (Step S218). In the case of the EPG data being available, the program is searched for that is scheduled to be broadcast on the same day and the same channel as and prior to the programmed broadcast program (Step S204). If the targeted program is present, program information relating to the program is acquired (Step S205). A search of character information in the acquired program data, e.g., detailed broadcast program information in which program titles, program contents, performers, etc. are described, is performed for extension keywords indicating that one or a plurality of preset broadcast programs is not extended (Step S206). As a result of the extension keyword search, when even one of the extension keywords is found (Step S207), the corresponding program is regarded as being non-extension one, whereby searching the next program ensues (Step S204). On the other hand, in the event that even one of the extension keywords has not been found, the following process, that is, a genre search ensues (Step S208). In the genre search (Step S208), a genre that a broadcast program targeted to be searched for belongs to is checked. If the genre to which the search-targeted program belongs is judged to be a genre possibly to be extended or delayed (Step S209), the next extension keyword search ensues (Step S210). If it is judged not, the next program search ensues (Step S204).

The extension keyword search (Step S210) searches character information in the same program data as in Embodiment 1, e.g., detailed program information in which program titles, program contents, performers, etc. are described, for extension keywords indicating that one or a plurality of preset programs is extended (Step S210). As a result of the extension keyword search, when only one extension keyword is found, and a plurality of extension keywords is found if their combination criterion is satisfied (Step S211), then the position of the one or the positions of the plurality of detected extension keyword will be acquired (Step S212). When no extension keywords are found, the processing moves to the next program search (Step S204). Whether or not broadcasting the program is extended or delayed is judged from either the one or the plurality of detected extension keywords and their positional relationship (Step S213). When the extension keywords and their positional relationships are judged to be of broadcast programs that are extended or delayed, the number of the programs to be extended is increased by one (Step S214). When the extension keywords and their positional relationship are judged unlikely to be extended or delayed, the process moves to the next program search (Step S204).

The processing repeats from Step S204 through Step 214 until the search of all the search-targeted programs is completed, and the process exits from the loop when no search-targeted programs are found to be present. Next, if the number of the extension program is equal to or smaller than zero, the process ends (Step S218). If the number is greater than zero (Step S215), a total extension time period is computed (Step S216) by multiplying the number of extension programs by the preset extension time period. Next, the recording end time is delayed from the recording end time that has been set by the computed total extension time period depending on the computed total extension time period. The above-described processing allows adjustment of the recording end time.

Next, a method of detecting a program extension will be demonstrated by giving examples of specific detection extension keywords. First, the detection extension keywords are relevant to the following (1) and (2),
(1) "Extension" +"occur" (the character of "occur" should appear within the predetermined number of characters in the rear space of "Extension" (here, within 10 characters)
(2) "shift" (regardless of positional relationship) non-extension keyword corresponds to the following (3),
(3) "No extension"
As a genre (support genre) likely to be extended,
(4) Cases of "Sports" being set will be described.

On the other hand, a program to be recorded is " Music XXX, Channel 8, recording start time 22:00, recording end time 23:00", search-targeted programs scheduled to be broadcast on the same channel and the same day as and prior to the program to be recorded are the following programs 1 through 5. Program 1: Title "Professional Baseball Game"
Detailed information " G vs. D (Maximum extension until 21:24, subsequently-broadcast programs to be shifted accordingly)",
Broadcast start time 19:00, Broadcast end time 21:00
Genre "Sports"
Program 2: Title "Golf Tour Tournament"
Detailed information "Extension may be occurred."
Broadcast start time 14:00, Broadcast end time 16:00
Genre "Sports"
Program 3: Title "Sports of Memories"
Detailed information "extension 17 innings YokoXX vs. PYgakuen at the end of the battle"
Broadcast start time 16:00, Broadcast end time 17:00
Genre "Sports"
Program 4: Title "Professional Baseball Game"
Detailed information "Yo vs. Ya (No extension, No shift)"
Broadcast start time 12:00, Broadcast end time 14:00
Genre "Sports"
Program 5: Title "Weekly (XX day) Drama "
Detailed information "A String of Kyoto ZZZ Murders, Screenplay by TANAKA XXichi, Directed by ITSUKI YYhiro"
Broadcast start time 21:00, Broadcast end time 22:00
Genre "Dramas"
Following the above-described Program 1 through Program 5 in the order, the flowchart as shown in FIG. 8 is executed.

Explanation will be started with Step S204 for searching the programs. In Step S204, Program 1 is selected; in Step 205, program titles, detailed information, and genres are read. Because non-extension keyword is not detected (StepS207), the program is relevant to a support genre (Step S209); by the extension keyword search (Step S210), the extension keyword of "Shift" can be found in the detailed information (Step S211); and its positional relationship does not matter(Step S213), the number of extension programs is set to "1." Next, the process returns to Step S204 to select Program 2, so that information on Program 2 is acquired (Step S205). Any non-extension keyword cannot be detected in this program either (StepS207); the program is relevant to a support genre (Step S209); by the extension keyword search (Step S210) "Extension" and "Occur" are found (Step S211); and the positional relationship between character strings "Extension" and "Yes" satisfies a preset condition (Step S213), the number of extension programs is set to "2" by further increasing by one. Next, the process returns again to Step S204 to select Program 3, thereby the information on the program 3 is acquired (Step S205). Since any non-extension keyword cannot be detected in this program either (StepS207); the program is relevant to a support genre (Step S209); by the extension keyword search (Step S210) "Extension" is found but not with "Occur" (Step S211), which does not satisfy the positional relationship between character strings "Extension" and "Occur" (Step S213); the number of extension programs will not be increased.

Next, the process returns to Step S204 to select Program 4, thereby the information on Program 4 is acquired (Step S205). This program includes in the detailed information the extension keyword "Shift", however, non-extension keyword "No extension" is inclusive, therefore, the process returns from Step 207 to Step 204. Next, the process returned to Step S204 to select Program 5, so that the information on Program 5 is acquired (Step S205). Since this program's genre is categorized into "Drama", which is not a support genre (Step S209), the process returns to Step S204. Since, with the above described processes, the search of all programs has been completed, the process moves to Step 215. Since the number of extension programs is two, the total extension time period is judged to be 60 minutes, i.e., multiplication of 30 (minutes per program) by 2 (programs) equals 60 (minutes) (Step S215, and Step S216), delaying the recording end time from 23:00 to 24:00. This reduces, even though each program is extended, occurrences in which part or the whole of the programmed broadcast program fails to be recorded.

Since, as discussed above, in the recording programming apparatus configured as in Embodiment 2, in contrast to cases in which the extension keywords having possibilities of extension or delay as in Embodiment 1 are detected, and thereby recording end time is delayed by a preset extension time period, broadcast programs subject to no extension nor delay are detected by using non-extension keywords, confusing characters, even though found in titles or detailed information, will not be mistakenly recognized.

Furthermore, by limiting genres where extensions are to be made, programs that belong to genres unlikely to be extended have no probability of misjudgment due to the extension keyword search, further requiring no time to perform the extension keyword search.

In addition to the extension keyword search, since the combination of a plurality of extension keywords, and detected positions of one or a plurality of extension keywords are evaluated, even in cases in which only a character string of "Extension" as in Program 3 is included and, although both characters strings of "Extension" and "Occur" are included, they indicate entirely different meaning, misjudgment of a non-extension program as being an extension program can be reduced remarkably.

Note that as an extension keyword, other phrase such as "extension until" may be used. Note again that it is preferable that the number of characters in the extension keyword be made to be four characters or more, whereby the mathematical probability of occurrence of unnecessary extensions can effectively be reduced. Note further that extension keywords, non-extension keywords, and support genres may be configured so as to be capable of being selected or set by a user's manipulation.

Also, Embodiment 2 is the same as above-described Embodiment 1 except for those described above.

INDUSTRIAL APPLICABILITY

According to an apparatus and method for programming the recording of broadcast programs, electronic program guide information acquired about programming broadcast programs, and the electronic program guide information acquired about programs scheduled to be broadcast on the same channel and the same date as and prior to the programmed broadcast program are searched for predetermined extension keywords indicating program extension or delay. Since, when a broadcast program is present in which an extension keyword is detected, the recording end time of a programmed broadcast program is delayed, even in cases where the programmed broadcast program, and a program broadcast prior to the programmed broadcast program, each on the same channel, is extended on real broadcasting, an occurrence in which part or the whole of the programmed broadcast program fails to be recorded can be avoided.

What is claimed is:

1. An apparatus for programming recording of broadcast programs, comprising:
    a recording device for recording onto a predetermined medium broadcast programs included in input signals; and
    a processing device programmed to execute a process of:
        setting the recording start time and the recording end time of a given broadcast program, to program the given broadcast program as a recording-scheduled program;
        acquiring electronic program-guide information;
        searching the electronic program-guide information that relates to one or more broadcast programs, which are to be broadcast on the same channel and the same date as and prior to the given broadcast program, for a predetermined extension keyword indicating a program extension or delay; and
        delaying the recording end time of the given broadcast program in response to detection, as a result of the search for the extension keyword, of a broadcast program in which the extension keyword has been found, wherein
    prior to the search for the extension keyword is set an incremental extension time period by which the recording end time is to be delayed for each broadcast program detected as a result of the search, and
    wherein, in response to the detection of a broadcast program in which the extension keyword has been found, the processing device adds to the recording end time, which is set for the given broadcast program, a value obtained by multiplying by the extension time period the number of broadcast programs in which an extension keyword has been found.

2. A recording programming apparatus as recited in claim 1, wherein the apparatus sets the extension time period based on user input.

3. A recording programming apparatus as recited in claim 1, wherein the extension keyword is a phrase having at least a predetermined number of consecutive characters.

4. A recording programming apparatus as recited in claim 1,
    wherein the extension keyword is a combination of two or more predetermined non-consecutive phrases, and the spacing between phrases forming the combination falls within a predefined number of characters.

5. An apparatus for programming recording of broadcast programs, comprising:
    a recording device for recording onto a predetermined medium broadcast programs included in input signals; and
    a processing device programmed to execute a process of:
        setting the recording start time and the recording end time of a given broadcast program, the given broadcast program being a first broadcast program, to program the given broadcast program as a recording-scheduled program;
        acquiring electronic program-guide information;
        searching the electronic program-guide information that relates to one or more broadcast programs, which are to be broadcast on the same channel and the same date as and prior to the given broadcast program, for a predetermined extension keyword indicating a program extension or delay; and
        delaying the recording end time of the given broadcast program in response to detection, as a result of the search for the extension keyword, of a broadcast program in which the extension keyword has been found, the broadcast program in which the extension keyword has been found being a second broadcast program,
    wherein prior to the search for the extension keyword is set an incremental extension time period by which the recording end time is to be delayed for each broadcast program detected as a result of the search, and
    wherein the electronic program guide information that relates to the second broadcast program is searched for a predetermined non-extension keyword indicating no extension/delay of the second broadcast program, and the broadcast program in which the non-extension keyword has been found is excluded from the search for the extension keyword.

6. A recording programming apparatus comprising:
a recording device for recording onto a predetermined medium broadcast programs included in input signals; and
a processing device programmed to execute a process of:
setting the recording start time and the recording end time of a first broadcast program, to program the first broadcast program as a recording-scheduled program;
acquiring electronic program-guide information;
searching the electronic program-guide information that relates to one or more broadcast programs, which are to be broadcast on the same channel and the same date as and prior to the first broadcast program, for a predetermined extension keyword indicating a program extension or delay; and
delaying the recording end time of the first broadcast program in response to detection, as a result of the search for the extension keyword, of a second broadcast program in which the extension keyword has been found,
wherein the processing device is further programmed to:
perform a search on the electronic program-guide that relates to the second broadcast program, for a genre to which the second broadcast program belongs, and
in response to detecting a genre which does not coincide with one of predetermined genres, exclude a broadcast program in which the detected genre has been found from the search for the extension keyword.

7. A recording programming method of setting the recording start time and the end time, and programming of recording a given broadcast program, comprising:
utilizing a processor to perform the following:
acquire electronic program guide information;
search electronic program guide information that relates to one or more broadcast programs, which are to be broadcast on the same channel and the same date as and prior to the given broadcast program to be programmed, for a predetermined extension keyword indicating a broadcast program extension or delay; and
delay a previously-set recording end time of the given broadcast program in response to detection, as a result of the search for the extension keyword, of a broadcast program in which the extension keyword has been found,
wherein prior to the search for the extension keyword is set an incremental extension time period by which the recording end time is to be delayed for each broadcast program detected as a result of the search, and
wherein, in response to the detection of a broadcast program in which the extension keyword has been found, the recording end time is delayed by:
computing a total extension time period obtained by multiplying by the extension time period the number of the broadcast programs in which the extension keyword has been found, and
delaying the given broadcast program's previously-set recording end time by the total extension time period.

8. A recording programming method as recited in claim 7, further comprising utilizing the processor to set the extension time period.

9. A recording programming method as recited in claim 7, wherein the extension keyword includes a phrase having at least a predetermined number of consecutive alphabetic characters.

10. A recording programming method as recited in claim 7, wherein the extension keyword is a combination of two or more non-consecutive phrases, and the spacing between phrases forming the combination falls within a predefined number of alphabetic characters.

11. A recording programming method of setting the recording start time and the end time, and programming a recording of a given broadcast program, comprising:
utilizing a processor to perform the following:
acquire electronic program guide information;
search electronic program guide information that relates to one or more broadcast programs, which are to be broadcast on the same channel and the same date as and prior to the given broadcast program to be programmed, for a predetermined extension keyword indicating a broadcast program extension or delay; and
delay a previously-set recording end time of the given broadcast program in response to detection, as a result of the search for the extension keyword, of a broadcast program in which the extension keyword has been found,
wherein prior to the search for the extension keyword is set an incremental extension time period by which the recording end time is to be delayed for each broadcast program detected as a result of the search, and
wherein the electronic program guide information that relates to the one or more broadcast programs is searched for the predetermined non-extension keyword indicating that the second broadcast program is not extended or delayed, and a program in which the non-extension keyword has been found is excluded from the search for the extension keyword.

12. A recording programming method of setting the recording start time and the end time, and programming of recording a first broadcast program, comprising:
utilizing a processor to perform the following:
acquire electronic program guide information;
search electronic program guide information that relates to one or more broadcast programs, which are to be broadcast on the same channel and the same date as and prior to the first broadcast program to be programmed, for a predetermined extension keyword indicating a broadcast program extension or delay; and
delay a previously-set recording end time of the first broadcast program in response to detection, as a result of search in the step of searching for the extension keyword, of a second broadcast program in which the extension keyword has been found,
wherein the electronic program guide information that relates to the one or more broadcast programs is found for the genre to which the second broadcast program belongs, and in response to detection of a genre which does not coincide with one of predetermined genres, then a broadcast program in which the detected genre has been found is excluded from the search for the extension keyword.

* * * * *